UNITED STATES PATENT OFFICE.

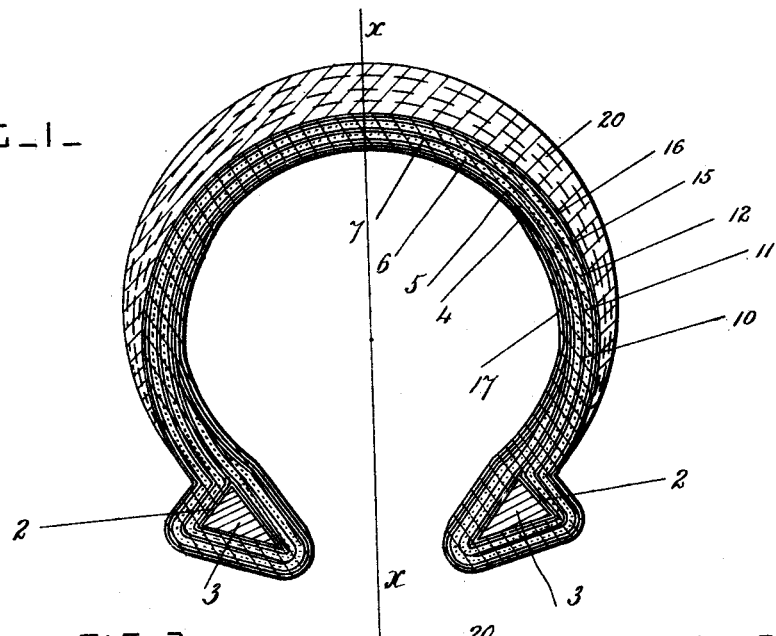
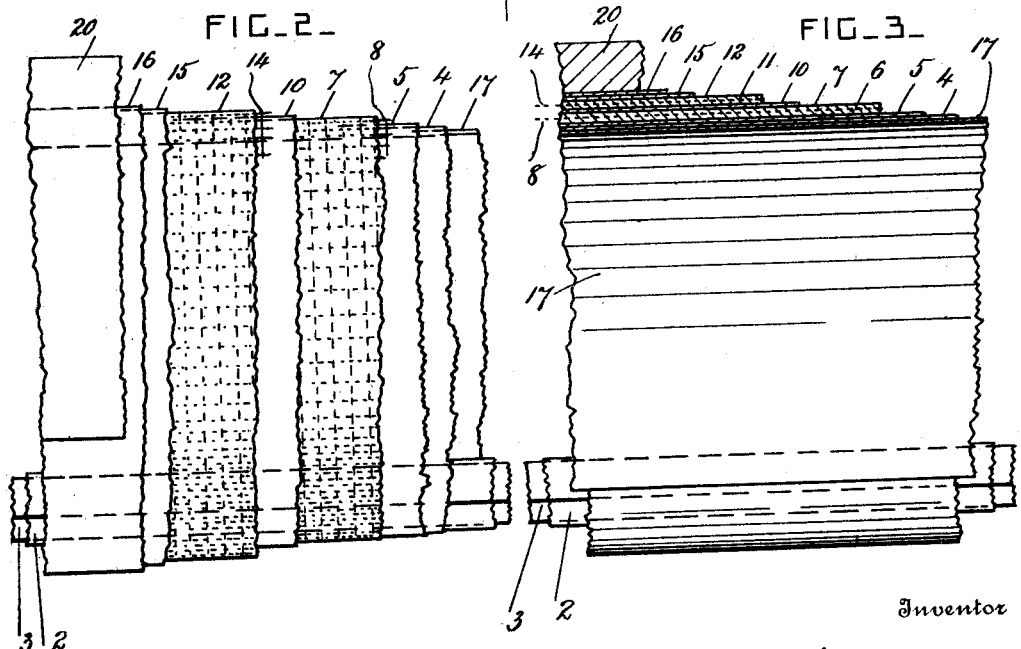

CLYDE VARNELL, OF HOUSTON, TEXAS.

TIRE.

1,138,027. Specification of Letters Patent. Patented May 4, 1915.

Application filed February 13, 1915. Serial No. 8,014.

*To all whom it may concern:*

Be it known that I, CLYDE VARNELL, a citizen of the United States, residing at Houston, in the county of Harris and State of Texas, have invented certain new and useful Improvements in Tires; and I do hereby declare the following to be a full, clear, and exact description of the invention, such as will enable others skilled in the art to which it appertains to make and use the same.

This invention relates to tires for vehicle wheels, which are provided with internal air tubes; and it consists in the novel construction of the outer cushion portion of the tire as hereinafter fully described and claimed.

In the drawings, Figure 1 is a cross-section through a portion of a tire constructed according to this invention. Fig. 2 is a side view of a portion of the tire showing the various layers. Fig. 3 is a longitudinal section through the tire taken on the line $x$—$x$ in Fig. 1, and also showing the various layers.

The air tube is of any approved construction, and it is placed inside the cushion portion of the tire, and is inflated in the usual way. The cushion portion is provided with two bead rings 3 formed of cores of hard rubber, and of any suitable cross-section. These bead ring cores are covered with a protecting layer of one ply light fabric 2. The main portion of the tire is arch-shaped and is formed of two layers 4 and 5 of vulcanizing fabric, such as canvas impregnated with india rubber compound. Each layer is formed with a single ply of canvas, and the layers are placed one over the other and are molded or bent to arch-shaped form, one layer being secured over the outer surfaces of the bead rings, and the other layer being secured over their inner surfaces. The main portion, comprising the layers 4 and 5, is covered with a reinforced cushion. This cushion comprises two sheets 6 and 7 of cushion stock, such as sheets of pure rubber, and a sheet of wire net or wire gauze 8 placed between them. The wire net may be formed of steel, copper, brass, or other metal, and it is preferably galvanized. This reinforced cushion extends over the outside of the main portion and around the beads and part way over the inside of the main portion. This reinforced cushion is covered with a sheet or layer of vulcanizing fabric 10, similar to the sheets 4 and 5, and the layer 10 extends over the outside only of the main portion and the outer parts of the bead rings. A second reinforced cushion is secured over the sheet 10. This second cushion comprises two sheets 11 and 12 of cushion stock having a sheet of wire net 14 between them, and it is similar in all respects to the inner reinforced cushion. This outer reinforced cushion extends over the outside and part way over the inside of the main portion in a similar manner to the inner reinforced cushion.

Two layers of vulcanizing fabric 15 and 16 are secured one over the other and over the reinforced cushions. Each layer 15 and 16 consists of a single ply of canvas impregnated with an india rubber compound, similar to the layers 4 and 5 which form the main portion, but the outer layer 16 is preferably continued for a greater distance over the inside surface of the cushion portion of the tire than the sheet 15. A sheet or layer 17 of vulcanizing fabric is also secured over the inside of the cushion portion of the tire. This layer 17 is similar to the sheets 4, 5, 15 and 16, and it extends over the inside portion only and forms a cover for the edges of the various layers which are lapped over the beads.

The tread 20 of the tire is preferably formed of tread stock, which is a compound of rubber specially adapted for the treads of tires. The tread is preferably formed of four layers of this tread stock, and it is secured to the middle portion of the tire. It is thickest in the middle, and its side portions are tapered on the sides of the tire.

After all the hereinbefore described layers have been secured in place to form the outer and cushion portion of the tire, the whole is subjected to a vulcanizing process. The tire thus formed is held in a suitable channeled wheel rim by its beads and by the air tube which is placed inside it and inflated. Tires constructed in this manner are found to give great satisfaction in use, and are reasonably inexpensive to manufacture. The air tube is protected from puncture by the cushion portion of the tire which also forms an elastic support.

What I claim is:

1. In a tire, a cushion portion, comprising two bead rings, a main portion of arch-shaped form formed of two layers of vulcanizing fabric having their respective edges secured over the inner and outer surfaces of the bead rings, an inner and an outer reinforced cushion secured over the main portion, each cushion comprising two sheets of cushion stock with a sheet of wire net between them, a layer of vulcanizing fabric interposed between the two said cushions, layers of vulcanizing fabric secured over the outer reinforced cushion, and an outer tread portion secured to the last said layers.

2. In a tire, a cushion portion, comprising two bead rings, a main portion of arch-shaped form formed of two layers of vulcanizing fabric having their respective edges secured over the inner and outer surfaces of the bead rings, an inner and an outer reinforced cushion secured over the main portion, each cushion comprising two sheets of cushion stock with a sheet of wire net between them, each cushion having its edges secured over the bead rings and portions of the inside surface of the main portion, a layer of vulcanizing fabric interposed between the two said cushions, layers of vulcanizing fabric secured over the outer reinforced cushion and extending over the bead rings and for different distances over the inside surface, a cover sheet of vulcanizing fabric secured over the overlapping edges of the sheets on the inside surface, and an outer tread portion secured to the last said layers.

In testimony whereof I have affixed my signature in the presence of two witnesses.

CLYDE VARNELL.

Witnesses:
  J. F. LUSHBAUGH,
  JACK CHAS. HEIDE.